United States Patent [19]
Roberts

[11] 3,955,305
[45] May 11, 1976

[54] UNIVERSAL FISHING WEIGHT

[76] Inventor: Earl F. Roberts, 400 Greenfield Drive, Space 119, El Cajon, Calif. 92021

[22] Filed: May 1, 1975

[21] Appl. No.: 573,417

[52] U.S. Cl. ............................................. 43/44.91
[51] Int. Cl.² ........................................ A01K 95/00
[58] Field of Search ............ 43/44.87, 44.91, 44.92, 43/44.95, 42.09

[56] References Cited
UNITED STATES PATENTS

| | | | |
|---|---|---|---|
| 2,772,509 | 12/1956 | Vadnais | 43/44.91 |
| 2,902,792 | 9/1959 | Friday | 43/44.91 |
| 2,908,992 | 10/1959 | Isbell | 43/44.95 |
| 3,808,728 | 5/1974 | Ratte, Jr. | 43/44.91 |

FOREIGN PATENTS OR APPLICATIONS

| | | | |
|---|---|---|---|
| 236,996 | 8/1959 | Australia | 43/44.91 |

*Primary Examiner*—Warner H. Camp

[57] ABSTRACT

A weight body which is provided with a longitudinally extending groove with opposed transverse grooves for receiving the lip portions of a retainer, the structure being such that it may be used four different ways.

1 Claim, 7 Drawing Figures

UNIVERSAL FISHING WEIGHT

This invention relates to fishing tackle and more particularly to a universal fishing weight.

It is therefore the principal object of this invention to provide a universal fishing weight which will have the advantage in that it may be used four different ways, thus taking the place of four different fishing weights.

Another object of this invention is to provide a universal fishing weight of which the main body has groove means for receiving a line, the groove having transverse end groove means for engaging the lip portions of a retainer which is snapably engaged within the main body.

Still another object of this invention is to provide a weight of the type described which will have notch means on the retainer for receiving the line in various fashions.

Other objects of the invention are to provide a universal fishing weight which is simple in design, inexpensive to manufacture, rugged in construction, easy to use and efficient in use.

These and other objects will become readily evident upon a study of the following specification together with the accompanying drawing wherein.

Figure 1:
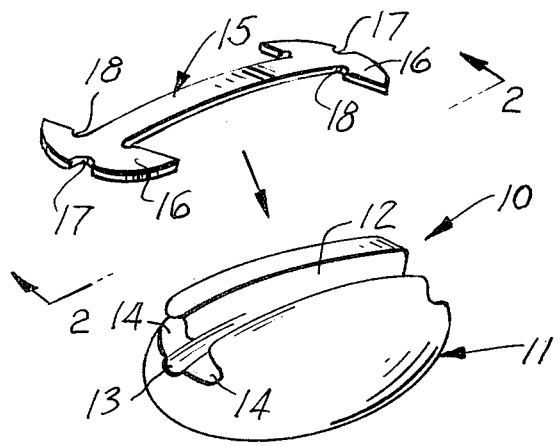
FIG. 1 is a perspective view of the present invention.
Figure 2:
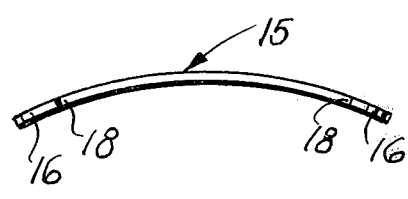
FIG. 2 is a view taken along the line 2—2 of FIG. 1 showing the curve required for the retainer to snap in place properly.

According to this invention, a universal fishing weight 10 is shown to include a main body 11 of oval configuration having a longitudinal side groove 12 which intersects with recess 13 and oppositely opposed transverse grooves 14. The retainer 15 includes end lips or cross arm portions 16 having a notch 17 at each end centrally of the outer peripheral edge and lips 16 are also provided with notches 18 on the straight peripheral edge.

Figure 3:
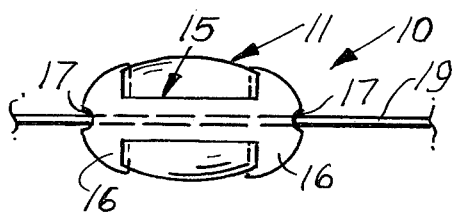
FIG. 3 is a plan view showing the arrangement of a loose weight on the line.

Referring now to FIG. 3 of the drawing, the fishing line 19 is shown to be free within the main body 11, the retainer 15 being snapably engaged within the main body 11.

Figure 4:
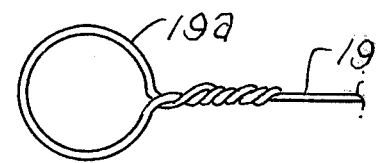
FIG. 4 is an enlarged plan view of a loop for the arrangement shown in FIG. 7.
Figure 5:
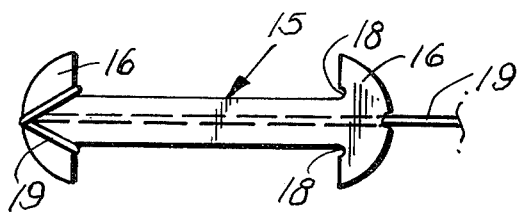
FIG. 5 is a plan view of the retainer with a line in loop arrangement for FIG. 7.
Figure 7:
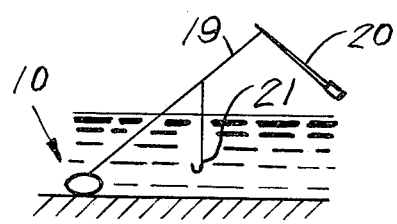
FIG. 7 is a diagrammatic view showing the weight in use.

In FIG. 4 of the drawing, line 19 is shown in loop 19a for use in FIG. 7.

Figure 6:
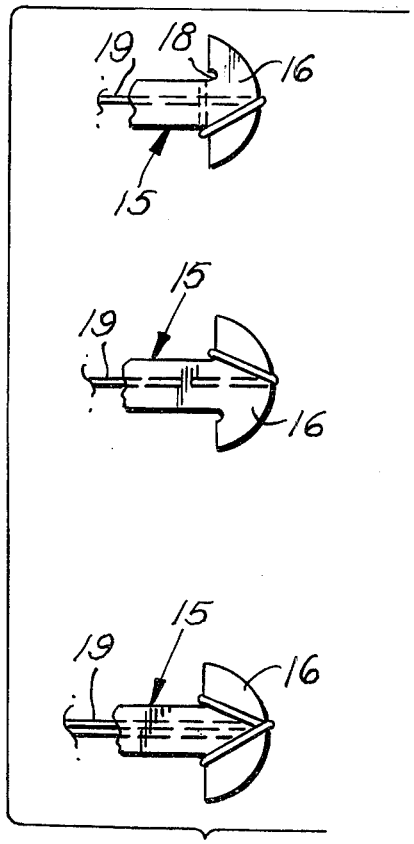
FIG. 6 is a fragmentary plan view of the retainer showing the solid end tie on both ends of the retainer.

In FIG. 6 the steps are shown for a solid end tie on both ends of the retainer 15 and the arrangement of FIG. 7 shows the line 19 attached to rod 20 for use with a snelled hook 21 above the sinker 10.

What I now claim is:

1. A Universal Fishing Weight for attachment to a fishing line, comprising in combination, a main body of ovaloid shape, a longitudinal groove on a side of said main body, a narrow recess in a bottom of said groove extending along a longitudinal center of said groove, said narrow recess receiving a fishing line, a transverse groove at each end of said longitudinal groove, a resilient retainer snapably received within said longitudinal and transverse grooves, said retainer including an elongated central portion receivable in said longitudinal groove, and a transverse cross arm portion at each end receivable in said transverse grooves, each said transverse cross arm portion having a notch at each corner where said cross arm portion junctions with said longitudinal portion, a terminal end of each said transverse cross arm portion having a rounded edge and having a notch along a center of said rounded edge, said notches in said corners and on said rounded edge receiving said fishing line wrapped around said cross arm portions.

* * * * *